United States Patent [19]
Toutonghi

[11] Patent Number: 5,586,318
[45] Date of Patent: Dec. 17, 1996

[54] METHOD AND SYSTEM FOR MANAGING OWNERSHIP OF A RELEASED SYNCHRONIZATION MECHANISM

[75] Inventor: Michael Toutonghi, Bellevue, Wash.

[73] Assignee: Microsoft Corporation, Redmond, Wash.

[21] Appl. No.: 176,132

[22] Filed: Dec. 23, 1993

[51] Int. Cl.⁶ ........................................ G06F 9/46
[52] U.S. Cl. .................... 395/677; 395/728; 395/726
[58] Field of Search .................... 395/650, 728, 395/726

[56] References Cited

U.S. PATENT DOCUMENTS

| | | | |
|---|---|---|---|
| 5,016,166 | 5/1991 | Van Loo et al. | |
| 5,138,713 | 8/1992 | Loten | 395/725 |
| 5,159,686 | 10/1992 | Chastain et al. | 395/650 |
| 5,187,790 | 2/1993 | East et al. | 395/725 |
| 5,247,675 | 9/1993 | Farrell et al. | 395/650 |
| 5,319,782 | 6/1994 | Goldberg et al. | 395/650 |
| 5,394,551 | 2/1995 | Holt et al. | 395/725 |

OTHER PUBLICATIONS

Haldar, S. and D. K. Subramanian, "Fairness In Processor Scheduling In Time Sharing Systems," *Operating Systems Review (SIGOPS)*, vol. 25, No. 1, Jan., 1991, pp. 4–18.
Deitel, H. M. and M. S. Kogan, "The Design of OS/2," Addison–Wesley Publishing Company 1992, p. 108, paragraph 2; p. 113, paragraph 2; p. 115, paragraph 3; p. 117, last paragraph, figure 5.5; p. 123, paragraph 3; p. 125, paragraph 2; p. 132, paragraph 3; and p. 135, last paragraph.

"Synchronization of Resource Access," *Research Disclosure*, No. 316, Aug. 1990, Disclosure No. 31691.
Tokuda, Hideyuki, Clifford W. Merrcer, "Priority Inversions in Real Time Communication," IEEE 1989 Symposium pp. 348–359.

*Primary Examiner*—Alvin E. Oberley
*Assistant Examiner*—St. John Courtenay, III
*Attorney, Agent, or Firm*—Seed and Berry LLP

[57] ABSTRACT

A method and system for managing ownership of a released synchronization mechanism is provided. In a preferred embodiment, a number of entities, such as threads, are attempting to acquire the synchronization mechanism when the synchronization mechanism becomes available. Each of the entities has a priority indicator that indicates the relative urgency of the attempt by the entity to acquire the synchronization mechanism. The method and system first identifies one of the entities attempting to acquire the synchronization mechanism that has the priority indicator that indicates that its attempt to acquire the synchronization mechanism is of the highest urgency. The method and system then determines whether any entity attempted to acquire the synchronization mechanism during a foregoing selected period of time. If an entity has attempted to acquire the synchronization mechanism during the selected period of time, then the method and system assigns ownership of the synchronization mechanism to the identified entity. If no entity has attempted to acquire the synchronization mechanism during the selected period of time, then the method and system defers the assignment of ownership of the synchronization mechanism to a later time.

2 Claims, 5 Drawing Sheets

METHOD AND SYSTEM FOR MANAGING OWNERSHIP OF A RELEASED SYNCHRONIZATION MECHANISM

TECHNICAL FIELD

The invention relates generally to a method and system for synchronizing resource use in a computer system, and, more specifically, to a method and system for managing ownership of a released synchronization mechanism for synchronizing resource use.

BACKGROUND OF THE INVENTION

Many modern computer operating systems are able to execute several programs simultaneously. Such operating systems are termed multitasking operating systems. In a multitasking operating system, each executing program is assigned a thread. A thread is a unit of execution. Each thread is associated with a thread execution block data structure for storing the information required to manage the execution of a portion of a single program, such as a program counter for tracking the instruction of the program currently being executed. Each thread typically contains a priority value indicating the relative urgency of its execution. While at least one thread must be assigned to each executing program, a single program may have more than one thread assigned to it if a user desires to execute different parts of that program simultaneously. An operating system in which more than one thread may be assigned to a single program is called a multi-threaded operating system. In a multitasking operating system running on a computer system having multiple central processing units (CPUs), different threads may actually execute simultaneously on different processors. On the other hand, in a multitasking operating system running on a single CPU, only one thread may be actually executing at any given time. In this case, the multitasking operating system gives the impression of simultaneous execution allowing the threads to each execute for a short periods of time. A period in which the multitasking operating system allows a particular thread to execute is called that thread's time slice. Time slices are scheduled via the multitasking operating system by considering both the relative priority of each of the threads and the recency of each thread's last time slice. That is, higher priority threads are scheduled before lower priority threads and threads that have not recently received a time slice are scheduled before threads that have recently received a time slice.

In a multitasking operating system (hereafter simply "operating system"), it is sometimes necessary to coordinate the execution of multiple threads seeking to use the same resource. For example, it is important to ensure that a hard disk drive is never used by more than one thread at the same time, as a thread using the hard disk drive is likely to depend on the state of the hard disk drive, which can be changed by another thread using the hard disk drive. Operating systems, therefore, usually provide one or more synchronization mechanisms to coordinate the execution of multiple threads seeking to use the same resource. Synchronization mechanisms generally restrict the use of use of a particular resource to a predetermined maximum number of threads (often one). A synchronization mechanism is in this way said to "protect" the resources whose use it restricts. Examples of synchronization mechanisms include semaphores, which are typically used to control the use of a shared resource that can support a limited number of multiple users; mutual exclusion mechanisms (mutexes), which are typically used to control the use of a shared resource that can only support a single user; and critical code sections (critical sections), which are usually used to limit access to a series of programming instructions to one thread at a time. An operating system might use a mutex to ensure that a hard disk drive is never used by more than one thread at the same time.

A thread that needs to use a resource that is protected by a synchronization mechanism first attempts to acquire the synchronization mechanism. In order to attempt to acquire the synchronization mechanism, the program in which the thread is executing calls an operating system service for requesting synchronization mechanisms. The operating system service for requesting synchronization mechanisms in turn calls an operating system service for acquiring synchronization mechanisms. Because a thread can call the operating system service for requesting synchronization mechanisms at any time at which it has the time slice, a thread's time slice also corresponds to a period of time during which the thread may attempt to acquire a synchronization mechanism. If fewer than the maximum number of threads are already using the resource, the synchronization mechanism allows the thread attempting to acquire the synchronization mechanism to do so. To allow the thread attempting to acquire the synchronization mechanism to do so, the operating system service for acquiring synchronization mechanisms returns a success return code to the operating system service for requesting synchronization mechanisms, which returns a success return code to the program in which the thread is executing. When the return code is the success return code, the program proceeds to the steps in which it uses the resource that is protected by the synchronization mechanism. If the maximum number of threads are already using the resource, the synchronization mechanism does not allow the thread attempting to acquire it to do so. Rather, the synchronization mechanism causes the thread attempting to acquire it to "block on" the synchronization mechanism. This involves the operating system facility for acquiring synchronization mechanisms modifying the administrative information stored about the identified thread to set a blocked flag indicating that the thread is blocked. This also involves adding the identified thread to a list of threads that are blocked on the synchronization mechanism. A thread that has blocked on a synchronization mechanism cannot resume executing until it is unblocked by the synchronization mechanism. This is achieved by the operating system by not permitting any blocked thread to receive a time slice. This prevents the blocked thread from returning from the operating system to the application program and proceeding to execute code that uses the resource. When a synchronization mechanism unblocks a thread, it may or may not allow the unblocked thread to acquire the synchronization mechanism. If the synchronization mechanism does allow the unblocked thread to acquire the synchronization mechanism by returning a success return code from the service for acquiring synchronization mechanisms to the service for requesting synchronization mechanisms, the service for requesting synchronization mechanisms returns a success code to the application program, and the thread may proceed to use the resource protected by the synchronization mechanism. If it does not by returning a failure return code to the service for requesting synchronization mechanisms, the thread may not immediately use the resource protected by the synchronization mechanism. In this case, the service for requesting synchronization mechanisms repeats its call to the service for acquiring synchronization mechanisms in a new attempt to acquire the synchronization mechanism. Once the thread has acquired the synchronization mechanism and completed its use of the protected resource, the thread releases the synchronization mechanism so that other threads may acquire it and use the protected resource. The thread releases the synchronization mechanism by calling an operating system facility for releasing synchronization mechanisms. During the period of time immediately following the release of the synchronization mechanism, the synchronization mechanism is known as "newly released."

A significant aspect of synchronization mechanism design involves selecting a scheme for determining which of the threads that are blocked on a newly released synchronization mechanism, if any, should be permitted to acquire the synchronization mechanism. This is known as managing ownership of the synchronization mechanism. When fewer than two threads are blocked on the newly released synchronization mechanism, the scheme is trivial. When no threads are blocked on the newly released synchronization mechanism, no threads need be permitted to acquire the synchronization mechanism immediately, and the synchronization mechanism permits the first thread that subsequently attempts to acquire it to do so. When one thread is blocked on the newly released synchronization mechanism, the synchronization mechanism usually permits the sole blocked on thread to acquire it. However, when two or more threads are blocked on the newly released synchronization mechanism, some scheme must be used to determine which blocked on thread should be permitted to acquire it.

Different schemes have been used to determine which of the threads that are blocked on a newly released synchronization mechanism, if any, should be permitted to acquire the synchronization mechanism. Such schemes are usually evaluated on the bases of the quantity of processing resources they consume ("efficiency") and the fairness with which they distribute access to the resource protected by the synchronization mechanism ("equity"). Equity is generally held to require adherence to two rules: (A) the synchronization mechanism must always permit itself to be acquired by the blocked thread having the highest priority and (B) if more than one blocked thread has the highest priority, the synchronization mechanism must permit itself to be acquired such that all of the blocked threads having the highest priority have equal opportunity to acquire the synchronization mechanism.

In a first scheme, the synchronization mechanism selects one blocked thread to unblock, then immediately permits the sole unblocked thread to acquire the synchronization mechanism. The synchronization mechanism typically selects the blocked thread having the highest priority, and selects arbitrarily from among multiple threads having the highest priority. The first scheme has the advantage that it is relatively equitable, adhering closely to the two equity rules. The first scheme has the disadvantage that it is relatively inefficient, because a thread is unable to release then reacquire the synchronization mechanism in a single time slice. This causes a thread switch for every acquisition of the synchronization mechanism by any thread. Because the context switching associated with a thread switch consumes significant processing resources, the first scheme is relatively inefficient.

Figure 1:
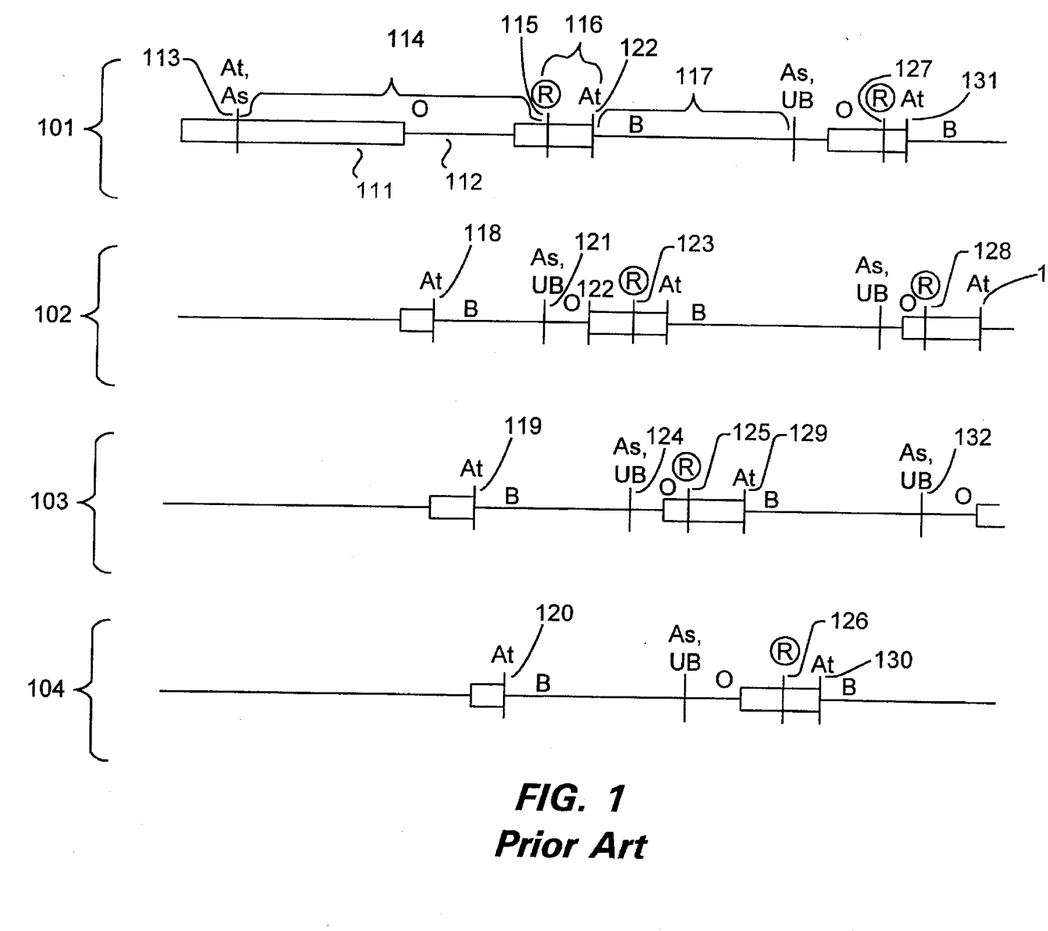
FIG. 1 is a timing diagram demonstrating the disadvantage of a first conventional scheme for determining which of the threads that are blocked on a newly released synchronization mechanism should be permitted to acquire the synchronization mechanism.

FIG. 1 is a timing diagram demonstrating the disadvantage of the first scheme for determining which of the threads that are blocked on a newly released synchronization mechanism should be permitted to acquire the synchronization mechanism. The timing diagram contains timelines 101, 102, 103, and 104, each corresponding to the activity of one of four threads having equal priorities. Each of the timelines is comprised of time slice periods, shown as horizontal rectangles, such as time slice 111 and wait periods, shown as horizontal line segments, such as wait period 112. Each timeline also contains events, shown as labeled vertical line segments, such as the attempt to acquire event and the assign event at time 113. The different events shown are as follows: the attempt to acquire event ("At"), in which the thread attempts to acquire the synchronization mechanism; the assigned event ("As"), in which the synchronization mechanism is assigned to the thread; the release event ("R"), in which the owning thread releases the synchronization mechanism; and the unblocking event ("UB"), in which a thread blocked on the synchronization mechanism is unblocked. Finally, each timeline also reflects states between events. These are shown as labels between events. As an example, the owned state during interval 114 of the synchronization mechanism by the first thread exists for the period of time between the attempt to acquire event and the assignment event at time 113 and the release event at time 115. Each thread, and therefore each timeline, has three different states: an owned state ("O"), in which the thread owns the synchronization mechanism, such as the owned state during interval 114; an unowned, unblocked state (no label), in which the thread does not own the synchronization mechanism and is not blocked, such as the unowned unblocked state 116; and a blocked state ("B"), in which the thread is blocked on the synchronization mechanism, such as the blocked state during interval 117. For the convenience of the reader, the major events depicted in FIG. 1 are listed below in chronological order in Table 1.

TABLE 1

| time | thread | event |
|------|--------|-------|
| 113 | 1 | attempts to acquire; permitted to acquire |
| 118 | 2 | attempts to acquire; blocks |
| 119 | 3 | attempts to acquire; blocks |
| 120 | 4 | attempts to acquire; blocks |
| 115 | 1 | releases |
| 121 | 2 | permitted to acquire |
| 122 | 1 | attempts to reacquire; blocks |
| 123 | 2 | releases |
| 129 | 2 | attempts to reacquire; blocks |
| 125 | 3 | releases |
| 130 | 3 | attempts to reacquire; blocks |
| 126 | 4 | releases |
| 131 | 4 | attempts to reacquire; blocks |
| 127 | 1 | releases |
| 132 | 1 | attempts to reacquire; blocks |

Initially the first thread receives a time slice 111 of processor time. During the time slice, the first thread successfully attempts to acquire the synchronization mechanism by calling the service for requesting synchronization mechanisms, which in turn calls the service for acquiring synchronization mechanisms. Note the attempt to acquire event and the assign event at time 113. The first thread owns the synchronization mechanism thereafter during the owned state during interval 114. At time 118, the second thread has the time slice and similarly attempts to acquire the synchronization mechanism. The attempt by the second thread fails because the synchronization mechanism is not available, i.e., is owned by the first thread. The second thread therefore blocks. At times 119 and 120, the third and fourth threads also attempt to acquire the synchronization mechanism when they receive the time slice. Since the synchronization mechanism is not available, the third and fourth threads block. Because the second, third, and fourth threads are blocked, the first thread receives the next time slice. At time 115, the first thread releases the synchronization mechanism. The circle around the "R" label shows that under the first scheme, the release causes the synchronization mechanism to be reassigned immediately. This is indicated by the assign event and the unblock event at time 121. At this point, the second thread begins owning the synchronization mechanism, pursuant to its attempt to acquire it at time 118. While the second thread has been unblocked, it cannot use the synchronization mechanism until it receives the time slice. The second thread receives the time slice at time 122, when the first thread attempts to reacquire the synchronization mechanism. Because the synchronization mechanism is not available, the attempt fails, and the first thread blocks, as can be seen by the blocked state at time 117. A second thread uses the synchronization mechanism during the first part of its time slice then releases the synchronization mechanism at time 123. The third thread is assigned ownership of the synchronization mechanism at time 124 and unblocked as the result of the release event at time 123. The cycle continues with release of the synchronization mechanism by the respective threads at times 125, 126, 127, and 128, causing reassignment of the synchronization mechanism and subsequent attempts to reacquire the synchronization mechanism by the same thread, shown by attempt events at times 129, 130, 131, and 132, which, in turn, causes a thread switch before the synchronization mechanism can be acquired again.

In a second scheme, the synchronization mechanism unblocks the blocked thread having the highest priority, but does not immediately permit any thread to acquire the synchronization mechanism. When the unblocked thread receives its next time slice, the unblocked thread repeats its attempt to acquire the synchronization mechanism. If the synchronization mechanism is available, the synchronization mechanism permits the unblocked thread to acquire the synchronization mechanism. Further, if two or more threads have the highest priority, the priority ranking of threads by the operating system adds a degree of randomness to selection between the threads having the highest priority. The second scheme has the disadvantage, however, that it permits a single thread to monopolize the synchronization mechanism.

Figure 2:
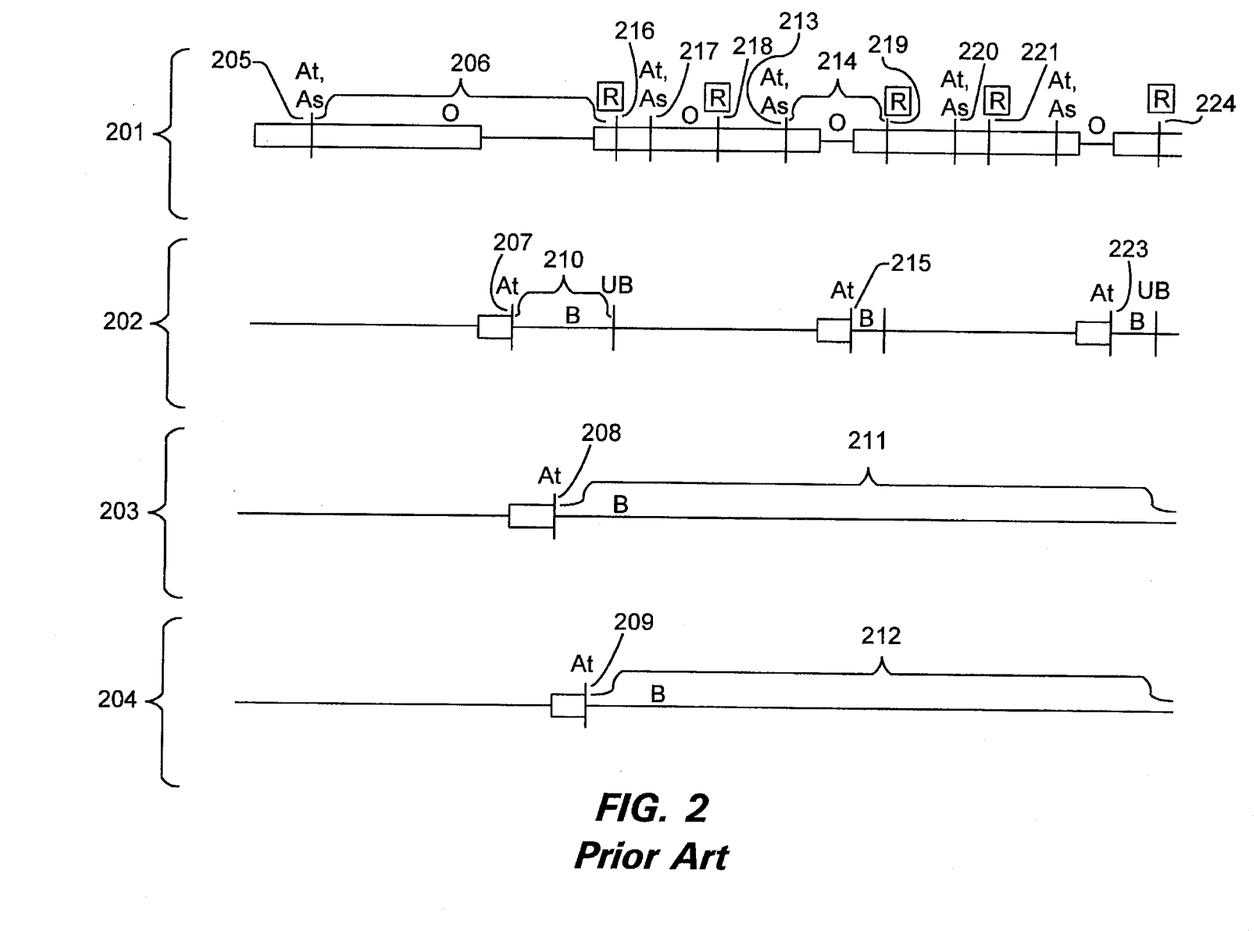
FIG. 2 is a timing diagram demonstrating the disadvantage of a second conventional scheme for determining which of the threads that are blocked on the newly released synchronization mechanism should be permitted to acquire the synchronization mechanism.

FIG. 2 is a timing diagram demonstrating the disadvantage of the second scheme for determining which of the threads that are blocked on the newly released synchronization mechanism should be permitted to acquire the synchronization mechanism. The timing diagram contains timelines 201, 202, 203, and 204. The timelines correspond to the activity of a first, second, third, and fourth thread, respectively, each of which has the same priority. For the convenience of the reader, the major events depicted in FIG. 2 are listed below in chronological order in Table 2.

TABLE 2

| time | thread | event |
| --- | --- | --- |
| 205 | 1 | attempts to acquire; permitted to acquire |
| 207 | 2 | attempts to acquire; blocks |
| 208 | 3 | attempts to acquire; blocks |
| 209 | 4 | attempts to acquire; blocks |
| 216 | 1 | releases |
| 217 | 1 | attempts to reacquire; permitted to reacquire |
| 218 | 1 | releases |
| 213 | 1 | attempts to reacquire; permitted to reacquire |
| 215 | 2 | attempts to acquire; blocks |
| 219 | 1 | releases |
| 220 | 1 | attempts to reacquire; permitted to reacquire |
| 221 | 1 | releases |
| 222 | 1 | attempts to reacquire; permitted to reacquire |
| 223 | 2 | attempts to acquire; blocks |
| 224 | 1 | releases |

The first thread receives the first time slice. At time 205, the first thread successfully attempts to acquire the synchronization mechanism. The first thread owns the synchronization mechanism during time interval 206. After the first thread time slice expires, the second, third, and fourth threads each receive a time slice and attempt to acquire the synchronization mechanism and attempt to acquire events at times 207, 208, and 209, respectively. Since the synchronization mechanism is owned by the first thread and unavailable, each of these three attempts to acquire the synchronization mechanism fail, causing the second, third and fourth threads to be blocked, as shown by the blocked states during time intervals 210, 211, and 212, respectively. After the second, third, and fourth threads block, the first thread receives the next time slice. The first thread releases and successfully attempts to reacquire the synchronization mechanism several times. Note the release events at times 216 and 218, and the attempt to acquire events at times 217 and 213. The rectangle around the "R" label of the release events in FIG. 2 shows that under the second scheme, a blocked on thread is unblocked on release but is not permitted to acquire the synchronization mechanism. Before this time slice expires, the first thread successfully attempts to acquire the synchronization mechanism at time 213. When the second thread receives a time slice at the expiration of the first thread time slice, the first thread still owns the synchronization mechanism, as shown by the owned state during interval 214. Therefore, when the second thread attempts to acquire the synchronization mechanism at time 215, the attempt fails. The second thread is blocked and, since the second, third and fourth threads are again all blocked, the first thread receives the next time slice. The first thread again releases and successfully attempts to reacquire the synchronization mechanism during its time slice, owning it when its time slice expires. Note the release events at times 219 and 221, and the attempt to acquire events at times 220 and 222. The cycle continues when the second thread always failing in its attempts to acquire the synchronization mechanism and the third and fourth threads never having another chance to attempt to acquire the synchronization mechanism. The overall effect is the total monopolization of the synchronization mechanism by the first thread.

As can be seen from the above discussion, existing schemes for transferring the ownership of a released synchronization mechanism are either inefficient or inequitable.

SUMMARY OF THE INVENTION

It is an object of the invention to provide a method and system in a computer system for managing ownership of a synchronization mechanism.

It is another object of the invention to provide a method and system in a computer system for assigning the ownership of a synchronization mechanism.

It is a yet another object of the invention to provide a method and system in a computer system for determining whether to reassign ownership of a synchronization mechanism formerly acquired and released by a formerly owning thread.

It is a further object of the invention to provide a method and system in a computer system for determining whether to permit use of a resource by a selected requesting thread that is requesting to use the resource before the requesting thread next requests to use the resource.

These and other objects, which will become apparent as the invention is more fully described below, are provided by a method and system for managing ownership of a synchronization mechanism. In a preferred embodiment, a number of entities, such as threads, are attempting to acquire the synchronization mechanism when the synchronization mechanism becomes available. Each of the entities has a priority indicator that indicates the relative urgency of the attempt by the entity to acquire the synchronization mechanism. The method and system first identifies one of the entities attempting to acquire the synchronization mechanism that has the priority indicator that indicates that its attempt to acquire the synchronization mechanism is of the highest urgency. The method and system then determines whether any entity attempted to acquire the synchronization mechanism during a foregoing selected period of time. If an entity has attempted to acquire the synchronization mechanism during the selected period of time, then the method and system assigns ownership of the synchronization mechanism to the identified entity. If no entity has attempted to acquire the synchronization mechanism during the selected period of time, then the method and system defers the assignment of ownership of the synchronization mechanism to a later time.

DETAILED DESCRIPTION OF THE INVENTION

The preferred embodiment of the present invention provides an efficient and equitable method and system for transferring ownership of a released synchronization mechanism. In the preferred embodiment, when a thread releases a synchronization mechanism, if any threads are blocked on the release synchronization mechanism, a software facility for managing ownership of the synchronization mechanism (the facility) unblocks the blocked on thread having the highest priority. The facility further determines whether any thread has blocked on the synchronization mechanism since the synchronization mechanism was last acquired. If so, then either a thread with a higher priority than the releasing thread has attempted to acquire the synchronization mechanism, or the operating system has given a time slice to a thread having the same priority as the releasing thread. In these cases, the facility immediately permits the unblocked thread to acquire the synchronization mechanism. This allows the thread with a higher priority than the :releasing thread that has attempted to acquire the synchronization mechanism or the thread having the same priority as the releasing thread that has received a time slice to immediately acquire the synchronization mechanism. Otherwise, the facility does not permit any thread to immediately acquire the synchronization mechanism. This allows the releasing thread to reacquire the synchronization mechanism while its time slice continues, and allows the next thread that receives a time slice and attempts to acquire the synchronization mechanism to do so.

Figure 3:
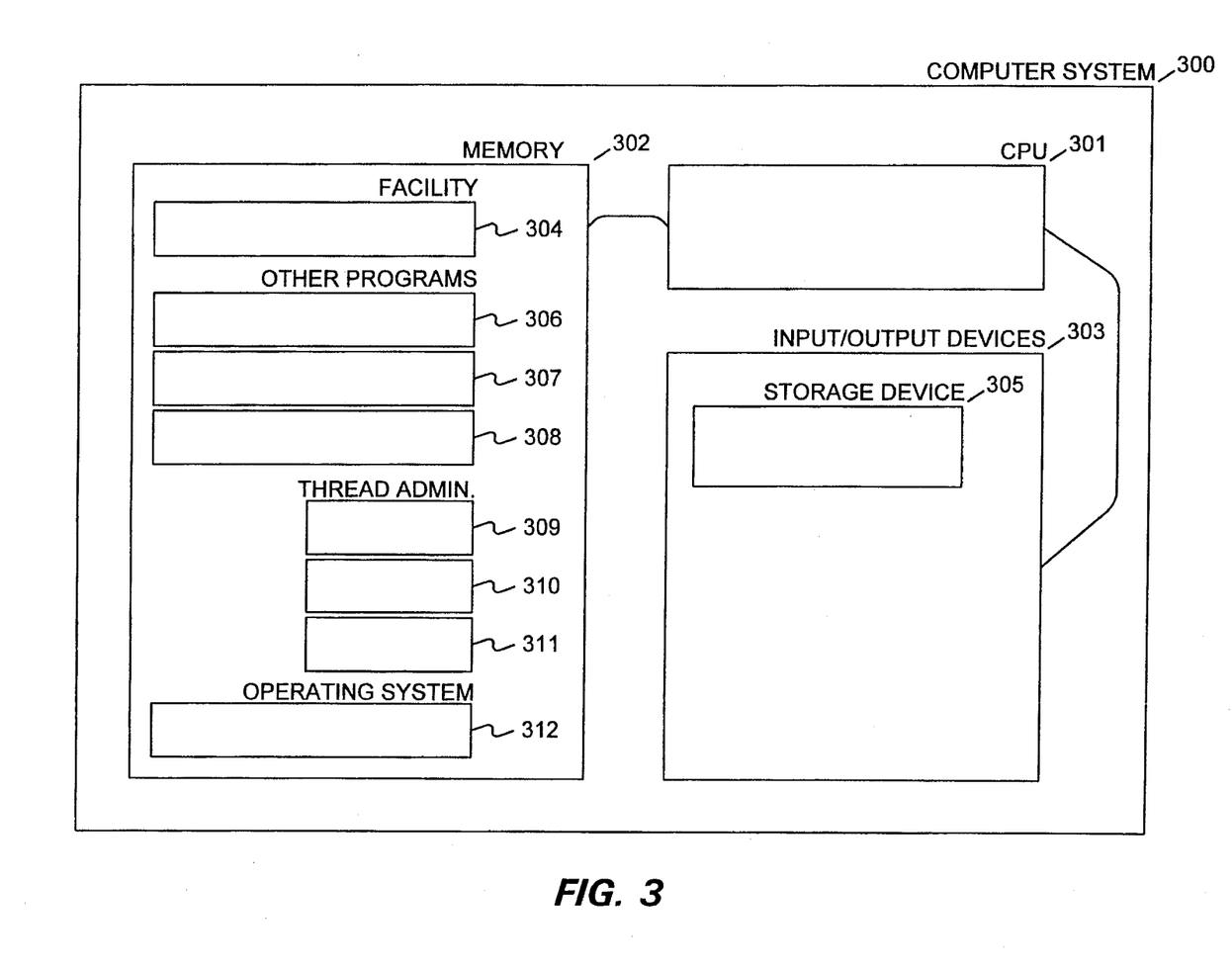
FIG. 3 is a high-level block diagram of an illustrative general-purpose computer system upon which the facility that constitutes the preferred embodiment operates.

FIG. 3 is a high-level block diagram of an illustrative general-purpose computer system within which the facility operates. The computer system 300 contains a central processing unit (CPU) 301, a computer memory (memory) 302, and input/output devices 303. The facility 304 is stored in the memory 302 and executes on the CPU 301. Other programs 306, 307, and 308 are also stored in the memory 302, as are administrative task information blocks 309, 310, and 311 which each holds administrative task information about the task executing in one of the programs 306, 307, and 308. The operating system 312 is also stored in the memory 302. Among the input/output devices is a storage device 305, such as a hard disk drive.

A thread that needs to use a resource that is protected by a synchronization mechanism first attempts to acquire the synchronization mechanism. It should be appreciated that synchronization mechanisms include at least semaphores, mutual exclusion mechanisms (mutexes), and critical code sections (critical sections). Synchronization mechanisms may protect such resources as storage devices, network adapters, serial communications adapters, display devices, sensitive sections of code, sensitive regions of memory, and other resources that may only be used by a limited number of threads at a time. The limited number of threads that may use a resource protected by synchronization mechanism at a single time is called the maximum number of threads for the synchronization mechanism, and is a characteristic of the particular synchronization mechanism that protects the protected resource.

In order to attempt to acquire the synchronization mechanism, the program in which the thread is executing calls an operating system service for requesting synchronization mechanisms which in turn calls an operating system service for acquiring synchronization mechanisms. If fewer than the maximum number of threads are already using the resource, the synchronization mechanism allows the thread attempting to acquire the synchronization mechanism to do so. To allow the thread attempting to acquire the synchronization mechanism to do so, the operating system service for acquiring synchronization mechanisms returns a success return code to the operating system service for requesting synchronization mechanisms, which returns a success return call to the program in which the thread is executing. When the return code is the success return code, the program proceeds to the steps where it uses the resource that is protected by the synchronization mechanism. If the maximum number of threads are already using the resource, the synchronization mechanism does not allow the thread attempting to acquire it to do so. Rather, the synchronization mechanism causes the thread attempting to acquire it to "block on" the synchronization mechanism. Causing the thread attempting to acquire the synchronization mechanism to block on the synchronization mechanism involves the operating system service for acquiring synchronization mechanisms modifying the administrative information stored about the identified thread to set a blocked flag indicating that the thread is blocked. Causing the thread attempting to acquire the synchronization mechanism to block on the synchronization mechanism also involves adding the identified thread to a list of threads that are blocked on the synchronization mechanism. A thread that has blocked on a synchronization mechanism cannot resume executing until it is unblocked by the synchronization mechanism. This is achieved by the operating system by not permitting any "blocked" thread to receive a time slice. This prevents the blocked thread from proceeding to execute code in the program that uses the resource. When the return code from the operating system service for acquiring synchronization mechanisms is the failure return code, the program will not proceed to the steps where it uses the resource that is protected by the synchronization mechanism. Rather, the operating system service for requesting synchronization mechanisms will call the operating system service for acquiring synchronization mechanisms again in another attempt to acquire the synchronization mechanism.

Figure 4:
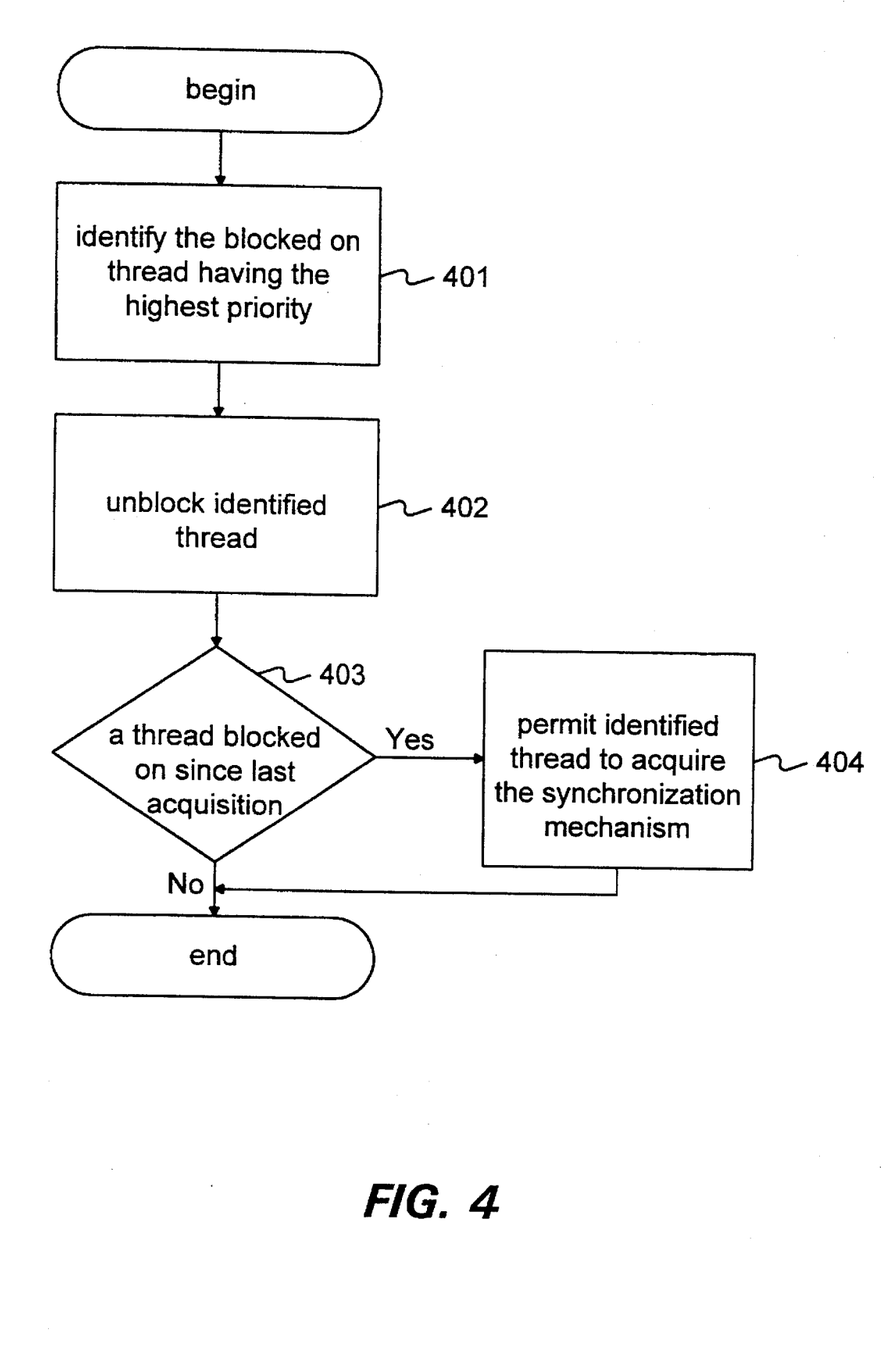
FIG. 4 is a flow diagram showing the steps carried out by the facility 304 when the synchronization mechanism is released.

FIG. 4 is a flow diagram showing the steps carried out by the facility 304 when the synchronization mechanism is released. The steps shown in FIG. 4 are only executed if one or more threads are blocked on the synchronization mechanism when it is released. If zero threads are blocked on the synchronization mechanism when it is released, a synchronization mechanism behaves like a conventional synchronization mechanism. In step 401, the facility 304 identifies the blocked thread having the highest priority. If, in step 401, there are no blocked threads, then these steps terminate (not shown). If, in step 401, more than one blocked thread has the highest priority, then the facility 304 selects one of the threads arbitrarily. In step 402, the facility 304 unblocks the identified thread. This involves calling the operating system to modify the administrative information stored about the identified thread to clear the blocked flag. This step also includes removing the identified thread from the list of threads that are blocked on the synchronization mechanism. In step 403, if a thread has blocked on the synchronization device since the last time the synchronization device was acquired, then the facility 304 continues at step 404, else these steps conclude without permitting any thread to acquire the synchronization mechanism. The facility 304 makes the determination in step 403 by checking a freshly blocked on flag that is set each time a thread blocks on the synchronization mechanism and cleared each time the synchronization mechanism is released. In step 404, the facility 304 permits the identified thread to acquire the synchronization mechanism. Step 404 involves storing the thread as the owner of the synchronization mechanism. This step also includes returning success to the operating system service for requesting synchronization mechanisms on return from the operating system service for acquiring synchronization mechanisms. The operating system service for requesting synchronization mechanisms then returns success to the operating system service for acquiring synchronization mechanisms. These steps then conclude.

Figure 5:
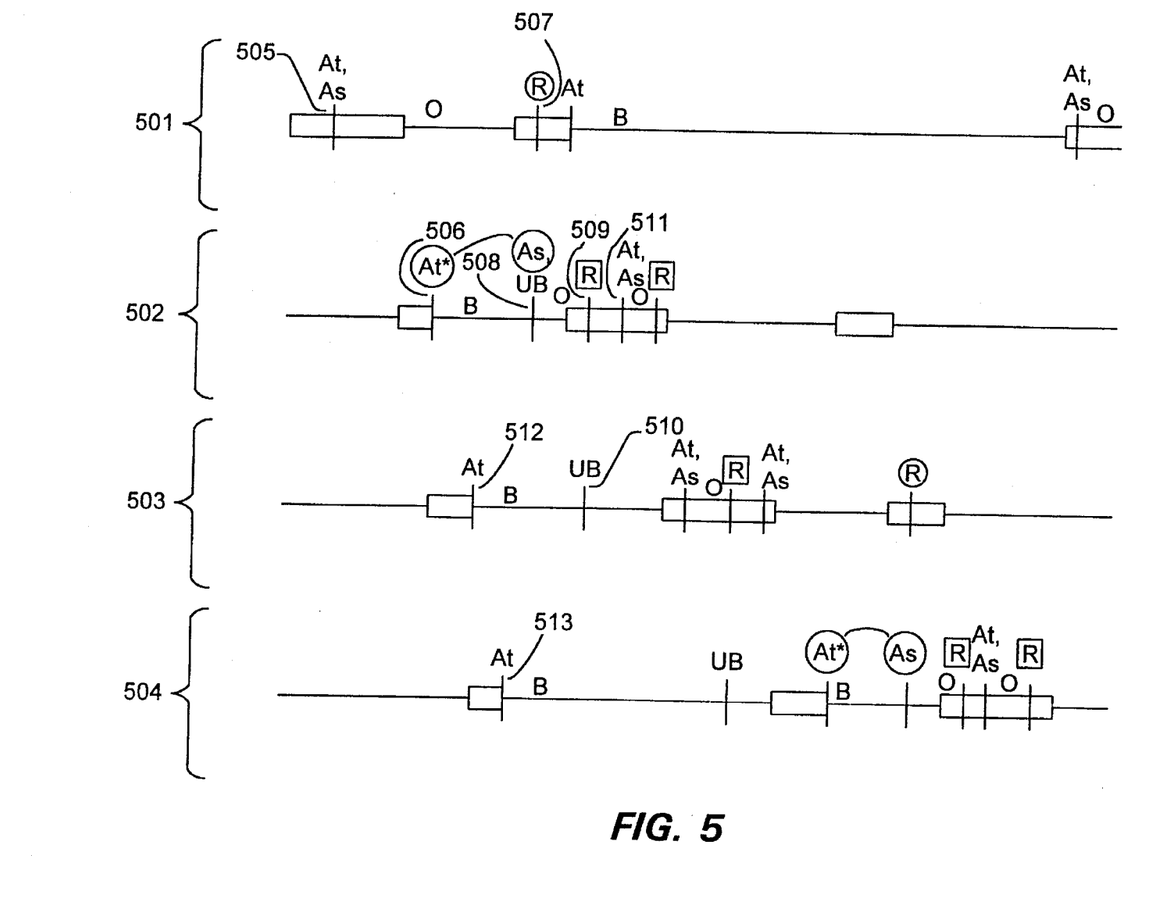
FIG. 5 is a timing diagram illustrating the operation of the facility 304.

FIG. 5 is a timing diagram demonstrating the advantages of the facility 304. The timing diagram contains timelines 501, 502, 503, and 504, which correspond to the activity of a first, second, third, and fourth thread, respectively. The four threads all have the same priority. For the convenience of the reader, the major events depicted in FIG. 5 are listed below in chronological order in Table 3.

TABLE 3

| time | thread | event |
| --- | --- | --- |
| 505 | 1 | attempts to acquire; permitted to acquire |
| 506 | 2 | attempts to acquire; blocks |
| 512 | 3 | attempts to acquire; blocks |
| 513 | 4 | attempts to acquire; blocks |

TABLE 3-continued

| time | thread | event |
| --- | --- | --- |
| 507 | 1 | releases |
| 508 | 2 | unblocked; assigns ownership |
| 509 | 2 | releases |
| 510 | 3 | unblocked |
| 511 | 2 | attempts to reacquire; permitted to reacquire |

The first thread receives the first time slice and successfully attempts to acquire the synchronization mechanism at time 505. Thereafter, the synchronization mechanism is owned by the first thread. The second thread gets the next time slice, during which it unsuccessfully attempts to acquire the synchronization mechanism at time 506. The second thread is thereafter blocked as shown by the "B" label between times 506 and 508. As shown by the asterisk following the "At" label of the attempt to acquire event at time 506, the attempt to acquire causes the facility to set the freshly blocked on flag. The third and fourth threads subsequently receive time slices and unsuccessfully attempt to acquire the synchronization mechanism at times 512 and 513 respectively, and therefore block thereafter. Because the second, third and fourth threads are blocked, the first thread receives the next time slice. At time 507, the first thread releases the synchronization mechanism. The facility checks whether the freshly blocked on flag is set in step 403. It is, because no thread has acquired the synchronization mechanism since time 506 when the second thread attempted to acquire the synchronization mechanism. The circle around the "R" label of the release event at time 507 shows that on release, the facility unblocks the second thread and assigns the synchronization mechanism to the second thread at time 508. The second thread thereafter owns the synchronization mechanism, and may use it as soon as it receives the next time slice. In the foregoing, the first thread was prevented from monopolizing the synchronization mechanism for more than two of its consecutive time slices.

During its time slice, the second thread releases the synchronization mechanism at time 509. As shown by the rectangle around the "R" label of the release event at time 509, the freshly blocked on flag is not set and therefore the third thread is unblocked at time 510, but the synchronization mechanism is not reassigned. This permits the second thread to succeed at its attempt to reacquire the synchronization mechanism at time 511, later during the same time slice. In foregoing, subsequent attempts by the same thread to acquire the synchronization mechanism during the same time slice do not cause an expensive thread switch unless other threads have attempted to acquire the synchronization mechanism during the owning thread's ownership.

While this invention has been shown and described with reference to preferred embodiments, it will be understood by those skilled in the art that various changes or modifications in form and detail may be made without departing from the scope of the invention. For example, it could be used for any use regulation device in which resource users are sometimes required to wait before they are permitted to use a resource.

We claim:

1. A method in a computer system for resolving competition for a synchronization mechanism by a first thread and a second thread, each of the threads adapted to being executed, suspended, and blocked, the threads each having a priority, the priority of the first thread being at least as great as the priority of the second thread, the method comprising the steps of:

(a) while the first thread is executing and the second thread is suspended, assigning the synchronization mechanism to the first thread;

(b) after step (a), suspending the first thread and executing the second thread;

(c) while the second thread is executing after step (b), detecting an attempt by the second thread to acquire the synchronization mechanism;

(d) in response to step (c), blocking the second thread and executing the first thread;

(e) while the first thread is executing after step (d), detecting the release of the synchronization mechanism by the first thread;

(f) in response to step (e), assigning the synchronization mechanism to the second thread;

(g) while the first thread is executing after step (f), detecting an attempt by the first thread to acquire the synchronization mechanism;

(h) in response to step (g), blocking the first thread and executing the second thread;

(i) while the second thread is executing after step (h), detecting the release of the synchronization mechanism by the second thread;

(j) while the second thread is executing after step (i), detecting an attempt by the second thread to acquire the synchronization mechanism; and (k) in response to step (j), assigning the synchronization mechanism to the second thread.

2. The method of claim 1, further including the step of, in response to step (i), declining to reassign the synchronization mechanism.

* * * * *